(12) United States Patent
Hurst-Hiller et al.

(10) Patent No.: US 7,930,629 B2
(45) Date of Patent: Apr. 19, 2011

(54) CONSOLIDATING LOCAL AND REMOTE TAXONOMIES

(75) Inventors: Oliver Hurst-Hiller, Redmond, WA (US); Michael I. Torres, Seattle, WA (US); Jane T. Kim, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1173 days.

(21) Appl. No.: 11/300,804

(22) Filed: Dec. 14, 2005

(65) Prior Publication Data

US 2007/0016575 A1    Jan. 18, 2007

Related U.S. Application Data

(60) Provisional application No. 60/699,282, filed on Jul. 14, 2005.

(51) Int. Cl.
*G06F 17/00* (2006.01)
*G06F 15/16* (2006.01)

(52) U.S. Cl. ........ 715/234; 715/200; 715/203; 715/230; 709/248

(58) Field of Classification Search .......... 709/230, 709/203, 248, 249; 715/200, 234, 203
See application file for complete search history.

(56) References Cited

U.S. PATENT DOCUMENTS

| | | | |
|---|---|---|---|
| 6,347,320 B1 * | 2/2002 | Christensen et al. | 707/102 |
| 6,792,575 B1 | 9/2004 | Samaniego et al. | |
| 6,941,560 B1 * | 9/2005 | Lowry et al. | 719/328 |
| 7,269,585 B1 * | 9/2007 | Burke | 1/1 |
| 2001/0005849 A1 * | 6/2001 | Boothby et al. | 707/1 |
| 2002/0103813 A1 * | 8/2002 | Frigon | 707/104.1 |
| 2002/0107829 A1 * | 8/2002 | Sigurjonsson et al. | 707/1 |
| 2003/0014483 A1 * | 1/2003 | Stevenson et al. | 709/203 |
| 2003/0120685 A1 * | 6/2003 | Duncombe et al. | 707/200 |
| 2004/0059783 A1 * | 3/2004 | Kazui et al. | 709/205 |
| 2004/0119760 A1 * | 6/2004 | Grossman et al. | 345/854 |
| 2004/0181555 A1 * | 9/2004 | Ratner et al. | 707/200 |
| 2004/0186824 A1 * | 9/2004 | Delic et al. | 707/3 |
| 2004/0199494 A1 * | 10/2004 | Bhatt | 707/3 |
| 2005/0132079 A1 * | 6/2005 | Iglesia et al. | 709/230 |
| 2008/0320094 A1 * | 12/2008 | Tu et al. | 709/206 |

FOREIGN PATENT DOCUMENTS

| | | |
|---|---|---|
| GB | 1533326 | 2/1975 |
| WO | WO02054699 | 7/2002 |
| WO | WO2005052732 | 6/2005 |

OTHER PUBLICATIONS

Cutrell, E., et al.; Using Categories to Improve Search (Search Under Interfaces Workshop Position Paper); 3 pages.

(Continued)

*Primary Examiner* — Chau Nguyen
(74) *Attorney, Agent, or Firm* — Shook, Hardy & Bacon L.L.P.

(57) ABSTRACT

A tag management system that enables consolidation, aggregation and/or synchronization of tags between local and remote sources. Further, the system provides users with a single rich view of client and Internet data related to appropriate tagging schemes. The system allows users to import and export tags and taxonomies from online service providers and provides a central location for users to store their tags. The central location is accessible to the user both on the client and for use online.

11 Claims, 17 Drawing Sheets

OTHER PUBLICATIONS

Picking up Where Search Leaves Off; a Layer of Social Knowledge; Business Week; Apr. 11, 2005; 4 pages.
Posts About: Folksonomies & Tagging; Business Week on Tagging; Apr. 4, 2005; 2 pages.
Semantic Mapping; ASF; 2 pages.
Buechner, M.; 50 Coolest Websites 2005: Lifestyle, Health and Hobbies; Flickr; 7 pages.
Mieszkowski, K.; The Friendster of photo sites; 3 pages.

* cited by examiner

*← 1200

| TAG CONTROLLER | | | | |
|---|---|---|---|---|
| TAG STORE: | ALL TAGS ◇ | | | |
| TAG BROWSER: | XY | | COPY | COPY & PASTE |
| | XY<br>XYYX<br>XY HH<br>XYYY YW<br>XYABC<br>XYXYXYXY | | | |

FIG. 12

CONSOLIDATING LOCAL AND REMOTE TAXONOMIES

CROSS-REFERENCE TO RELATED APPLICATIONS

This application claims the benefit of U.S. Provisional Patent application Ser. No. 60/699,282 entitled "ENABLING CLIENT-BASED TAGGING OF INTERNET CONTENT AND VIEWING OF TAGGED INTERNET CONTENT" and filed Jul. 14, 2005. The entirety of the above-noted application is incorporated by reference herein.

BACKGROUND

The amount of data available to information seekers has grown astronomically, whether as the result of the proliferation of information sources on the Internet, or because of private efforts to organize business information within a company, or any of a variety of other causes. As the amount of available data grows, so does the need to be able to categorize or label that data so that the data can be more efficiently searched. One approach is to use tagging for this task.

Tagging is the processing of adding or attaching metadata such as descriptive attributes to a data object. A tag can be thought of as a category name. As used herein, a data object can be any type of data (e.g., a website, a text file, an image). Typically, the data object content is unchanged by the application of a tag. Operating systems, search mechanisms and filtering mechanisms may utilize tags to organize, sort or filter data objects. A taxonomy or system of classification can be defined by a set of tags.

Tagging has become prevalent on the Internet as a means for organizing, and identifying relevant websites, articles and other data objects. Internet services allow users to apply tags to websites, photographic images, articles and the like. Tagging provides users with the ability to classify data objects both for their own use and for use by others. Popular web sites such image sharing applications allow users to tag and share photographic images and websites with communities of users.

Tagging is also useful within the context of a single client and allows the user to organize data within the client. For example, a user may store a collection of photographic images on the client. As such, the user may apply the tag "vacation" to photographs taken while on holiday and "graduation" to photographs graduation ceremony. By sorting the photographs utilizing the tags, the user is able to retrieve the appropriate photographs quickly and efficiently without having to view irrelevant and/or unwanted photographs.

In general, a user may use one or more taxonomies for various websites or web services and a separate taxonomy or taxonomies for a client computer. However, utilizing separate taxonomies makes it difficult for the user to maintain consistent organization of relevant data objects. Slight variations in tag names may result in users being unable to locate relevant information. For example, a user may apply the tag "vacation" to data objects stored on the client computer. Similar, relevant data objects can be tagged "vacation_Paris" or "vacation_2005" in a taxonomy on an Internet service. A search on the Internet service for those similar data objects utilizing the user's "vacation" tag will most likely fail to locate those relevant data objects.

In addition, inconsistent taxonomies make it more difficult to share data objects and a data object with a unique tag is less likely to be found by other users. A data object with tags that are consistent with the taxonomy used by an Internet service or a group is much more likely to be located and used by other users than a data object with unique tags. Moreover, a given taxonomy can become more valuable as more data objects are tagged within the given taxonomy. As the number of participants utilizing taxonomy increases, the volume and variety of the data objects retrievable using that taxonomy tend to increase.

Conventional computer systems require a user to run separate searches to retrieve data objects from Internet services and from the client computer and other local data storage, even if the user utilizes identical taxonomies on the client computer and on Internet services. Consequently, users may have to run multiple searches to locate data objects from various data sources. In addition, the user may forget to search a relevant data source and, therefore, fail to locate pertinent data objects.

SUMMARY

The following presents a simplified summary of one or more embodiments of a data management system in order to provide a basic understanding of some aspects of such embodiments. This summary is not an extensive overview, and is intended to neither identify key or critical elements of the embodiments nor delineate the scope of such embodiments. Its sole purpose is to present some concepts of the described embodiments in a simplified form as a prelude to the more detailed description that is presented later.

The data management system and/or methods as described herein, in one aspect thereof, provides for managing, sorting and/or filtering data objects. The data management system can include a rich viewing mechanism that provides an aggregated view of data objects retrieved from external sources and client data sources.

In another aspect, the data management system may also include a tag management system that allows users the ability to import and export tags and taxonomies from external data sources and services to a tag table on the client computer and vice versa. The tag table can provide a mechanism that enables users to utilize the same set of tags for local data objects as well as data objects available from external data sources and/or services. In addition, the data management system can include a user interface system that enables users to apply tags from the tag table to local data objects and/or data objects available from external data sources and services.

Still another aspect employs rules-based logic to predetermine and/or preset one or more thresholds in accordance with the novel functionality of the innovation. In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings. The following description and the annexed drawings set

BRIEF DESCRIPTION OF THE DRAWINGS

FIG. 12 illustrates an embodiment of a user interface for tag management.

DETAILED DESCRIPTION

Figure 1:
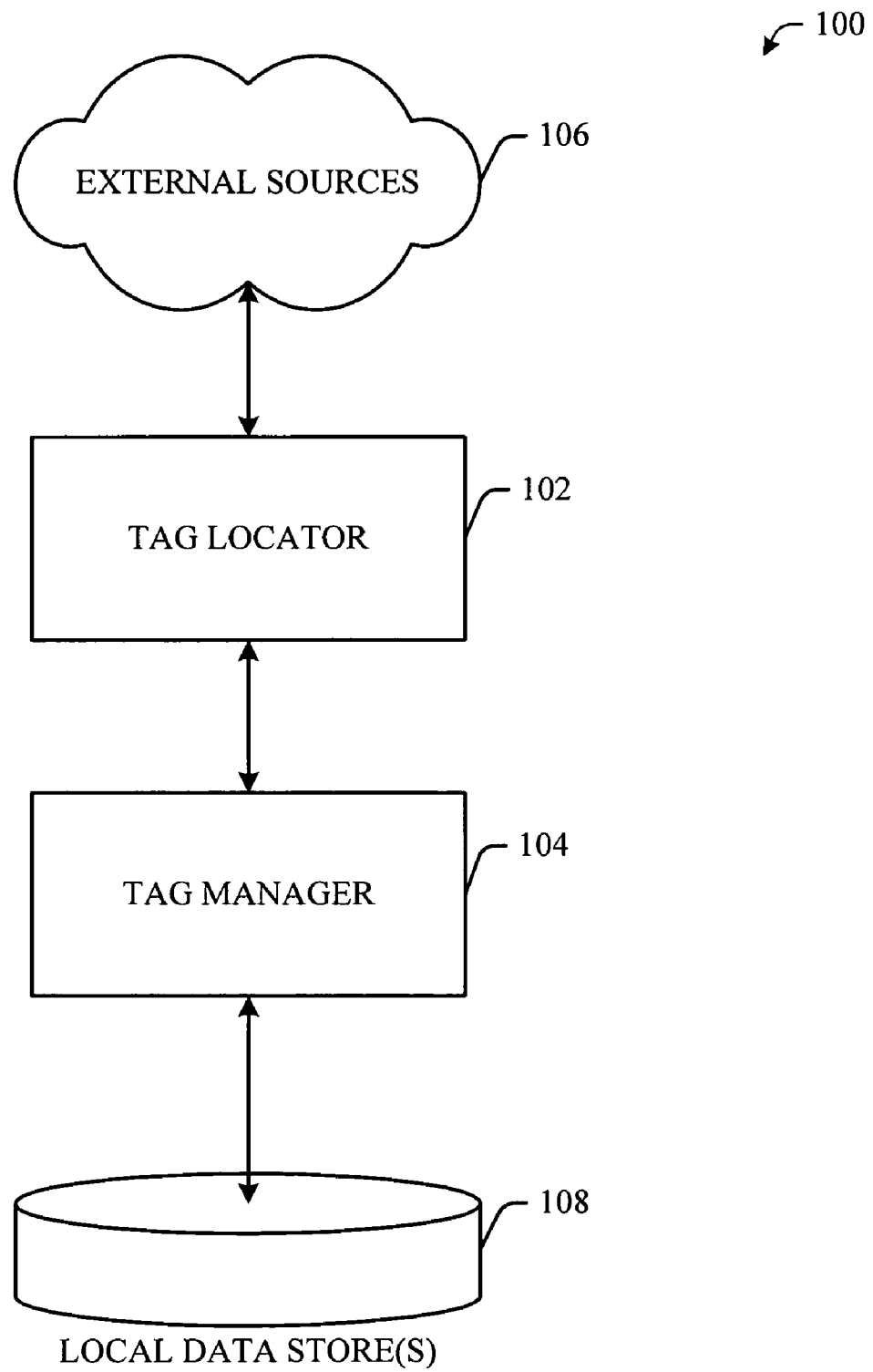
FIG. 1 illustrates an embodiment of a system that facilitates consolidating local and remote taxonomies in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It can be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates a system 100 that facilitates rich tagging of content via disparate sources. Generally, system 100 can include a tag locator component 102 and a tag manager component 104. In one aspect, the system 100 can facilitate integration of tagged content from external sources 106 with tagged content from internal or local sources 108. More particularly, the system 100 can enable integration with tagged external sources 106 (e.g., Internet). It will be appreciated that this is especially compelling since tagging is oftentimes very much a critical mass mechanism, both in terms of breadth of data stores and the number of participants (e.g., for public community tagging, folksonomies).

The system illustrated in FIG. 1 can facilitate client-based functionalities by enabling external source (e.g., 106) tagging via a client or other remote device. In doing so, the tag locator component 102 and the tag manager component 104 can facilitate searching (e.g., querying) external services (e.g., Internet, remote data stores) thereafter integrating located data into rich data views. Additionally, these components (102, 104) can facilitate roaming and synchronizing user tags (e.g., local tags) with tags from external sources 106. It is to be understood and appreciated that the novel functionality described herein can be applied to any operating system, search mechanism, toolbar or the like without departing from the spirit and scope described herein.

In operation, the tag locator component 102 can be employed to locate (e.g., search, query) for existing tags both from external sources 106 (e.g., Internet, Intranet, user-specific cloud, external server) and from device-based (e.g., client-based) data stores 108. Accordingly, the tag manager component 104 can be employed to consolidate, synchronize, render, and display all or a subset of located tags and/or data related thereto. By way of example, the tag manager component 104 can be utilized to consolidate all tags associated to a particular user or content type. These consolidated tags can be placed into an aggregated list or "sandbox" which can be accessed with respect to tagging content. One particular advantage of this approach is the ability to effectuate constancy with respect to tags that correspond to a particular type of content.

Figure 2:
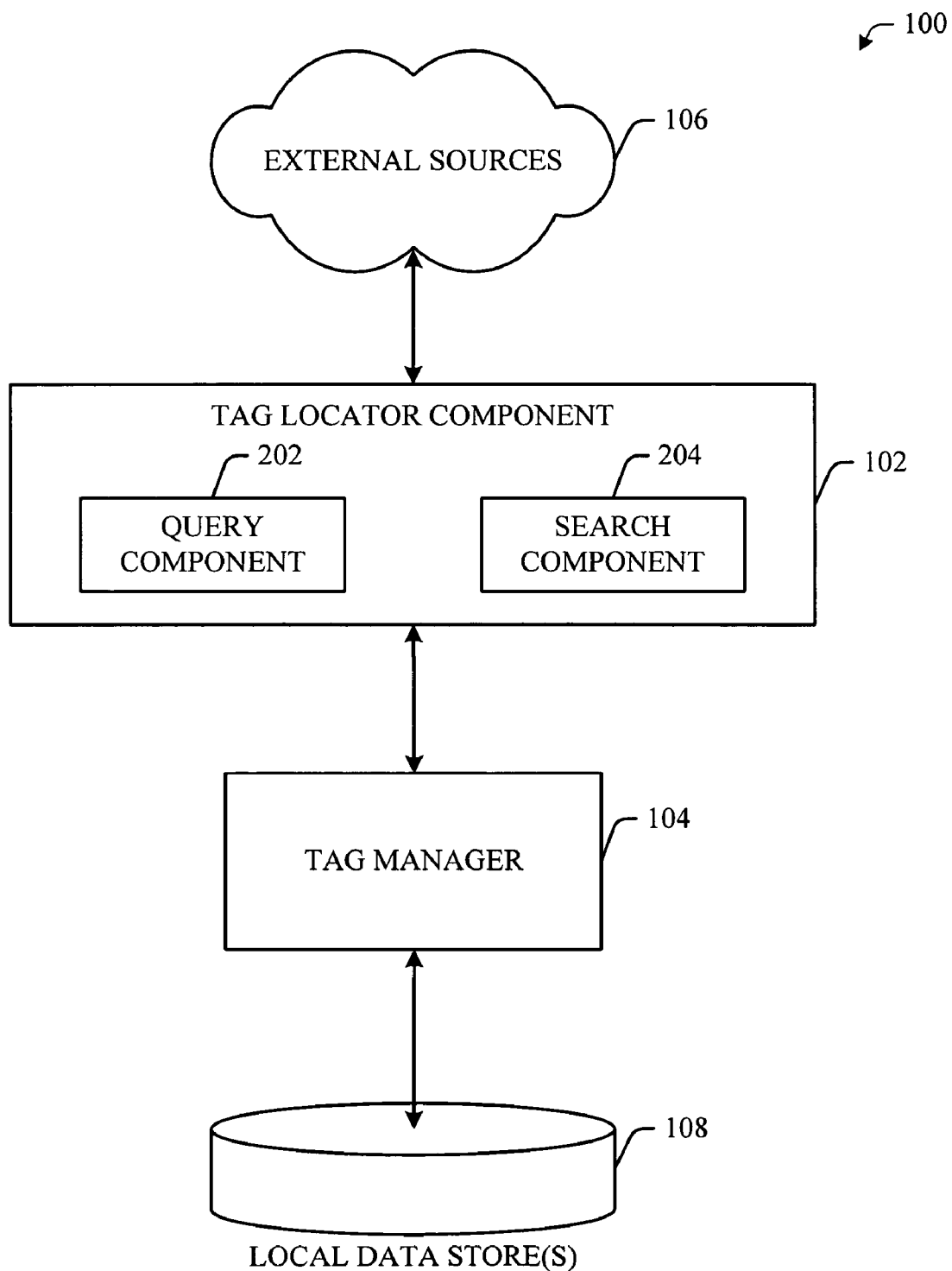
FIG. 2 illustrates an embodiment of a system that employs a query component and a search component to locate data related to a taxonomy.

Referring now to FIG. 2, an alternative block diagram of system 100 that facilitates locating and managing tags in accordance with an aspect of the innovation is shown. As described with reference to FIG. 1, the system 100 can include a tag locator component 102 and a tag manager component 104. These components (102, 104) can facilitate obtaining, organizing and rendering tags from disparate locations (e.g., external sources 106 and local data stores 108).

Turning now to a discussion of the tag locator component 102, this component can include a query component 202 and a search component 204. The query component 202 can facilitate a specific query or look-up of tags. In one example, a query can be generated to locate tags that correspond to a specific user. In another aspect, the query can be established to locate tags that contain a specific keyword, group of keywords, or part of a keyword. In still another example, the query component 202 can be employed to locate tags that correspond to a specific data type (e.g., photos, music).

It is to be understood that an unlimited number of additional query options exist. These alternative aspects are to be included within this scope of this disclosure and claims appended hereto. In other words, it is understood that the novel concepts and functionality described herein can be applied to an endless number of scenarios, each of which is to be included within spirit and scope of this disclosure and claims appended hereto.

In one example, a user can define query criteria based upon a specific utility and/or preference. In another example, the system can automatically define the query based upon a predefined rule or set of rules as well as an inferred intention. These rules-based and artificial intelligence (AI) query generation mechanisms will be described in detail infra with respect to FIGS. 14 and 15. As will be described with reference to FIGS. 14 and 15, these features can facilitate automatic generation of query criterion.

Once a query has been defined via the query component 202, the search component 204 can be employed to implement the query. As shown, the search component 204 can be employed to locate tags in an external source 106 and/or an internal or local data store 108. As described with reference to the query component 202, rules-based logic and/or AI mechanisms can be utilized to infer a location or group of locations for which to search.

Figure 3:
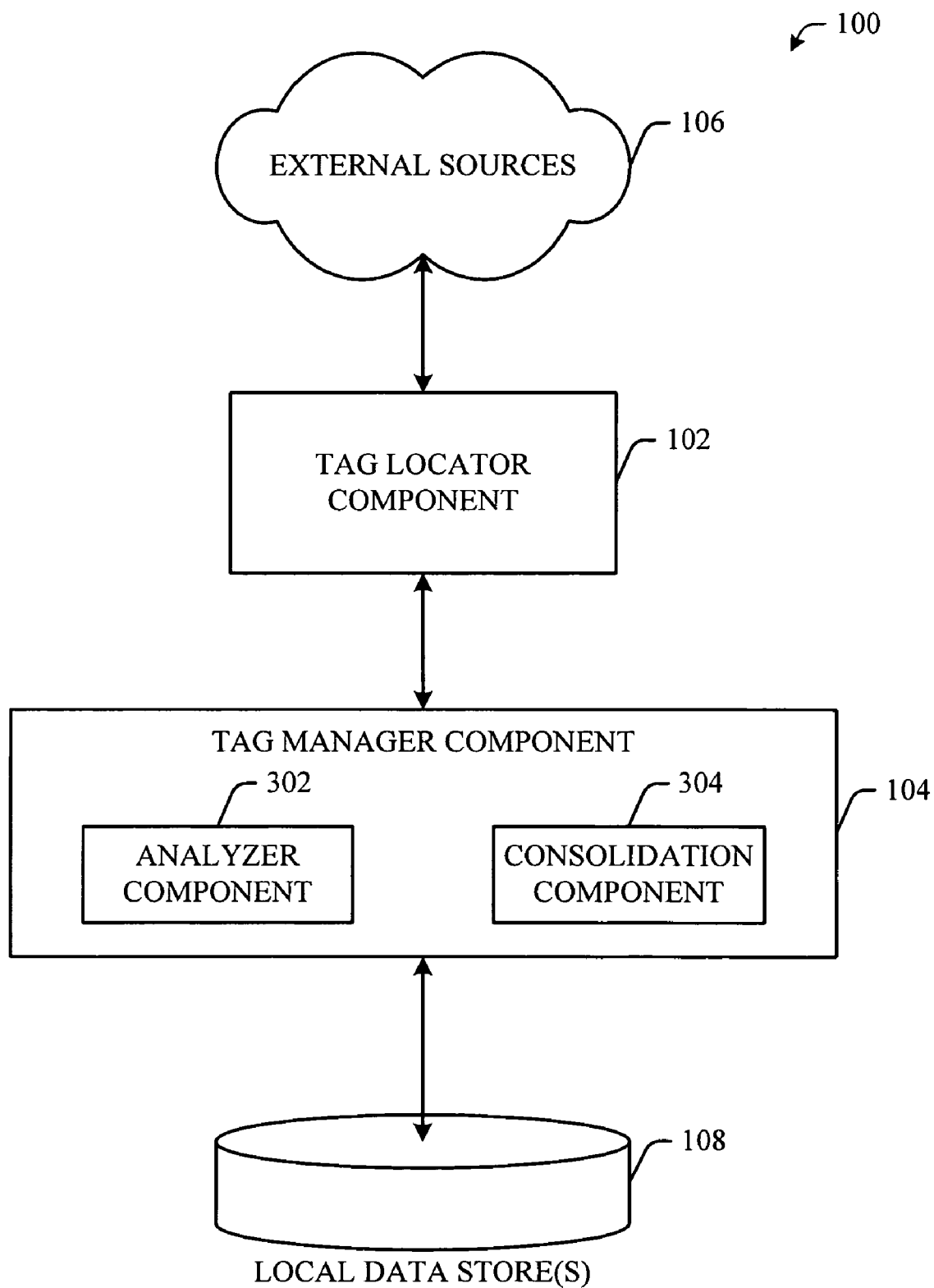
FIG. 3 illustrates an architectural diagram of a system that facilitates analyzing and consolidating taxonomies in accordance with an aspect of the novel subject matter.

FIG. 3 illustrates yet another architectural diagram of system 100 that facilitates managing tags from a number of disparate sources (e.g., 106, 108) in accordance with an aspect of the innovation. More particularly, tag manager component 104 can include an analyzer component 302 and a consolidation component 304. Each of these components will be described in detail below.

Additionally, although the tag manager component 104 is illustrated with particular components included therein, it will be appreciated that other aspects of the tag manager component 104 can include a subset of these components. Moreover, additional components can be included within the tag manager component 104 and can particularly enhance functionality thereof. These additional aspects of the tag manager component 104 will be described in detail below.

In accordance with the aspect of FIG. 3, once a tag or group of tags is located via the tag locator component 102, the analyzer component 302 can be employed to examine the obtained tags. For example, the analyzer component 302 can compare each of the retrieved tags to each other as well as to tags maintained within a user space (e.g., sandbox). In a specific example, the analyzer component 302 can compare tags relating to a specific data type.

Accordingly, the consolidation component 304 can be employed to aggregate and/or synchronize tags between local and external sources (e.g., 108, 106). In aspects, this consolidation can include an aggregation of all tags related to a user and/or type of content (e.g., photos). Additionally, the consolidation component 304 can be employed to synchronize tags between disparate sources. By way of example, the consolidation component 304 can be employed to synchronize tags between a user space on the Internet (e.g., user cloud related to external source 106) and an internal data store 108. This example will be better understood with reference to FIG. 4.

Figure 4:
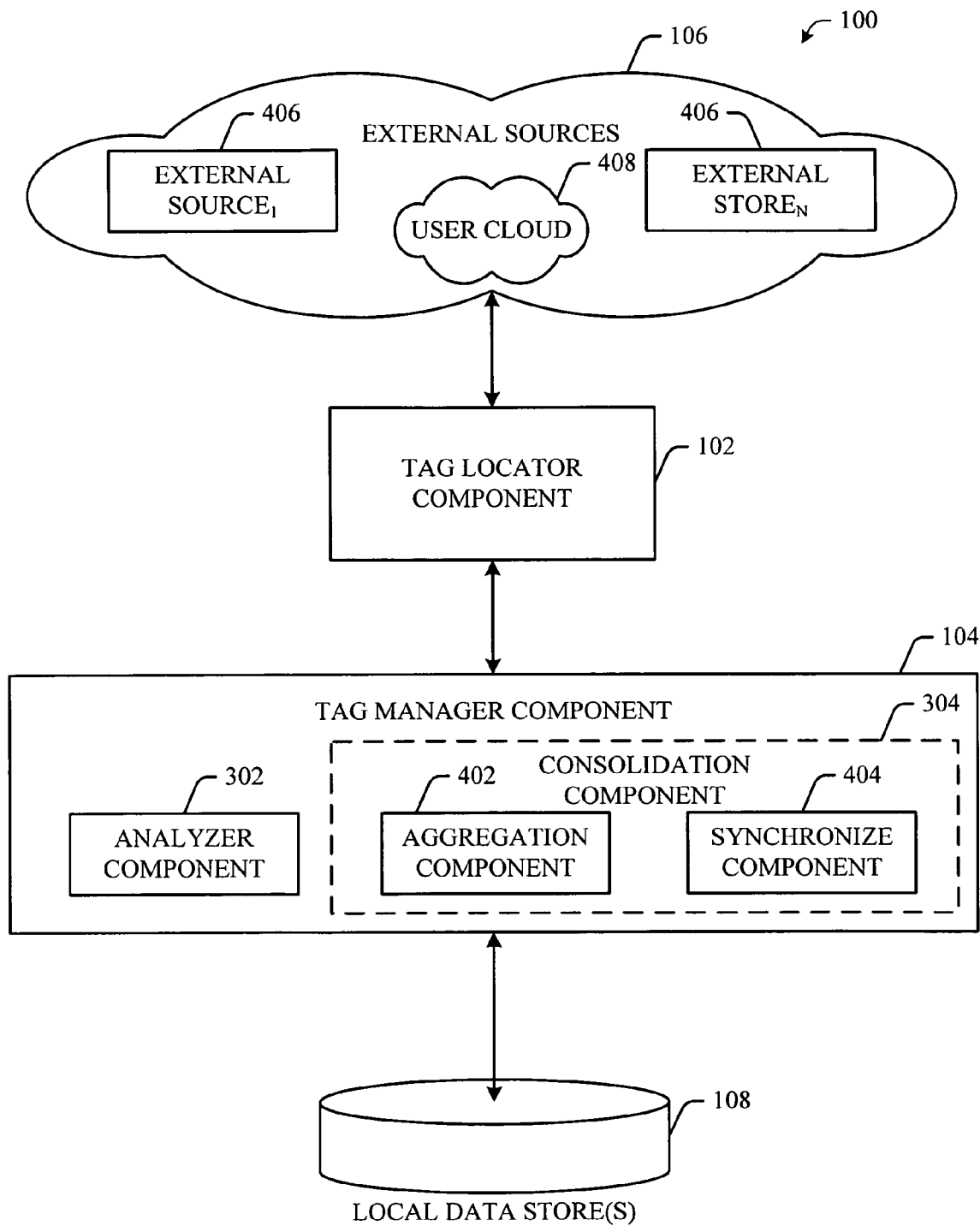
FIG. 4 illustrates a block diagram of a system that facilitates aggregating and/or synchronizing taxonomies in accordance with an aspect of the innovation.

FIG. 4 illustrates an alternative architectural block diagram of system 100 in accordance with an aspect of the innovation. As shown, the tag manager component 104 can include an analyzer component 302, an aggregation component 402 and a synchronization component 404. As described with reference to FIG. 3, the system 100 can aggregate and synchronize tags in accordance with a predefined and/or inferred criterion. The aggregation component 402 and synchronization component 404 can effectuate these actions upon the tags.

Also illustrated in FIG. 4 is an external sources component 106 that can include 1 to N external stores, where N is an integer. These 1 to N external stores can be referred to individually or collectively as external stores 406. In one example, an external store 406 can be representative of the Internet as a whole or a specific location therein. In another example, an external store 406 can include a remote server and/or database.

In a more specific example, consider an external service such as an online photo management sharing application. In this example, a user can define a query (e.g., via type, keyword) and thereafter employ the tag locator component 102 to facilitate obtaining tags from the application. These tags can include public as well as private tags (e.g., those contained within a user cloud 408) associated with the application. Once obtained, the analyzer component 302 can be employed to work in conjunction with the aggregation component 402 and/or the synchronize component 404 to manage the tags.

Continuing with the example, the aggregation component 402 can combine the obtained tags to those maintained locally (e.g., local data store(s) 108). Additionally, the synchronize component 404 can compare the obtained tags to those maintained locally thereafter generating a synchronized set of tags. This synchronized set of tags can be communicated to both the external sources 106 as well as to the local data store 108 thus harmonizing the local tags with remote tags.

Figure 5:
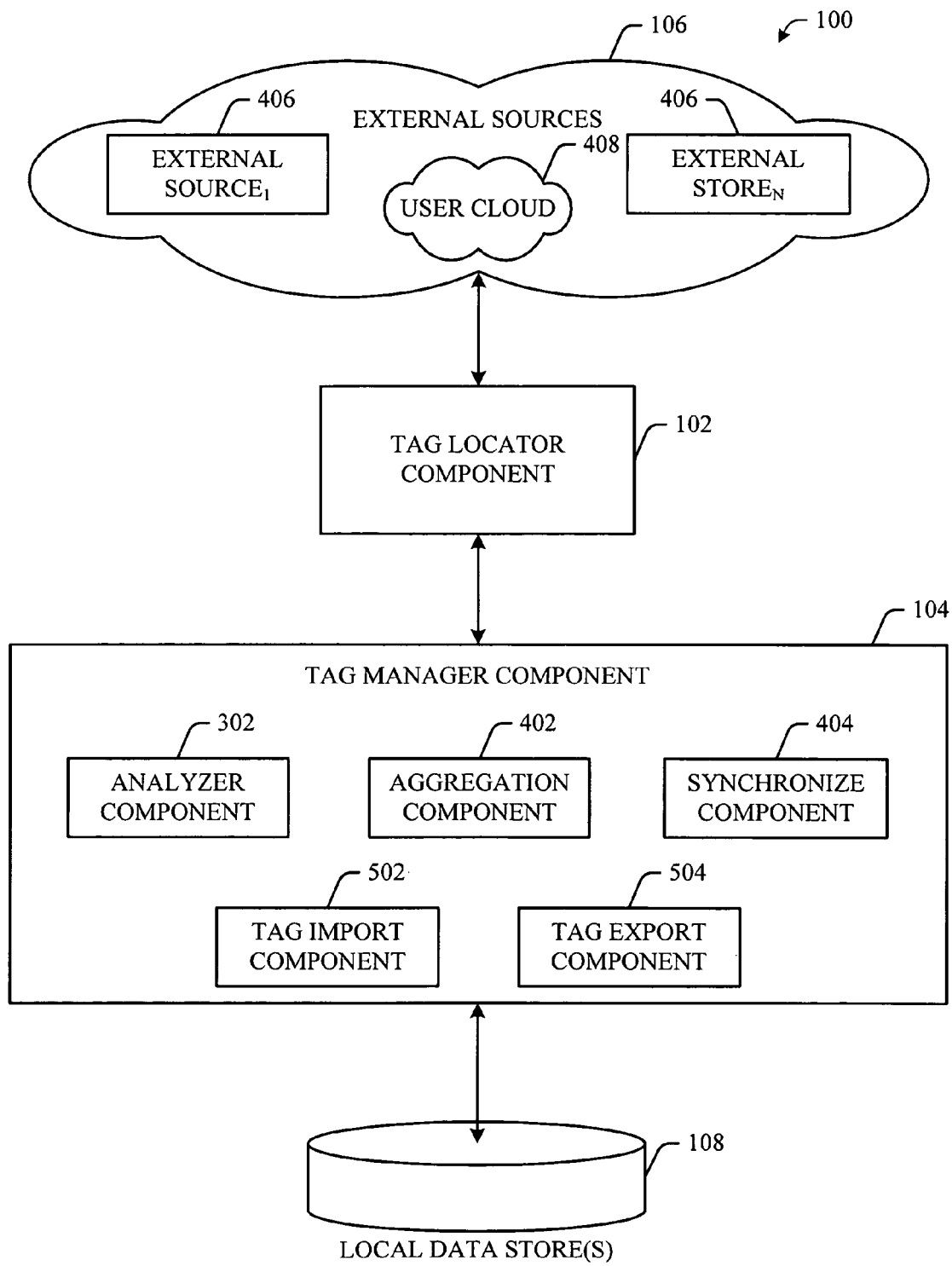
FIG. 5 illustrates an architectural diagram of a system that facilitates importing and exporting taxonomies in accordance with an aspect of the innovation.

FIG. 5 illustrates a system 100 that facilitates a tag import component 502 and a tag export component 504 in accordance with an aspect of the innovation. In operation, the tag import component 502 can facilitate importing tags from external sources 106 into local data stores 108. This tag import component 502 can work together with the tag locator component 102 to locate tags specific to a user, data type, etc. thereafter automatically importing the tag information into the local data stores(s) 108. It will further be appreciated that this tag import component 502 can dynamically import tags that fall within a predefined and/or inferred category.

By way of example, a standing query can be put into place via the tag locator component 102. As such, any tags that fall within criterion defined by this standing query can be automatically or dynamically imported via the tag import component 502. In one example, when a user generates a new tag with an online photo sharing application, the system 100, via tag import component 502, can automatically import this new tag thereafter employing the aggregation and/or synchronization component 402, 404 to incorporate this tag to data maintained within local data stores 108.

Similarly, a tag export component 504 can be provided to aggregate and/or synchronize locally established tags with external sources 106. Continuing with the example, suppose a user establishes a local tag that corresponds to a Hawaiian vacation. This tag can be automatically exported to appropriate locations within external sources 106. The query functionality of the tag locator component 102 can be employed to locate appropriate locations and/or data to tag with this new locally established tag.

Figure 6:
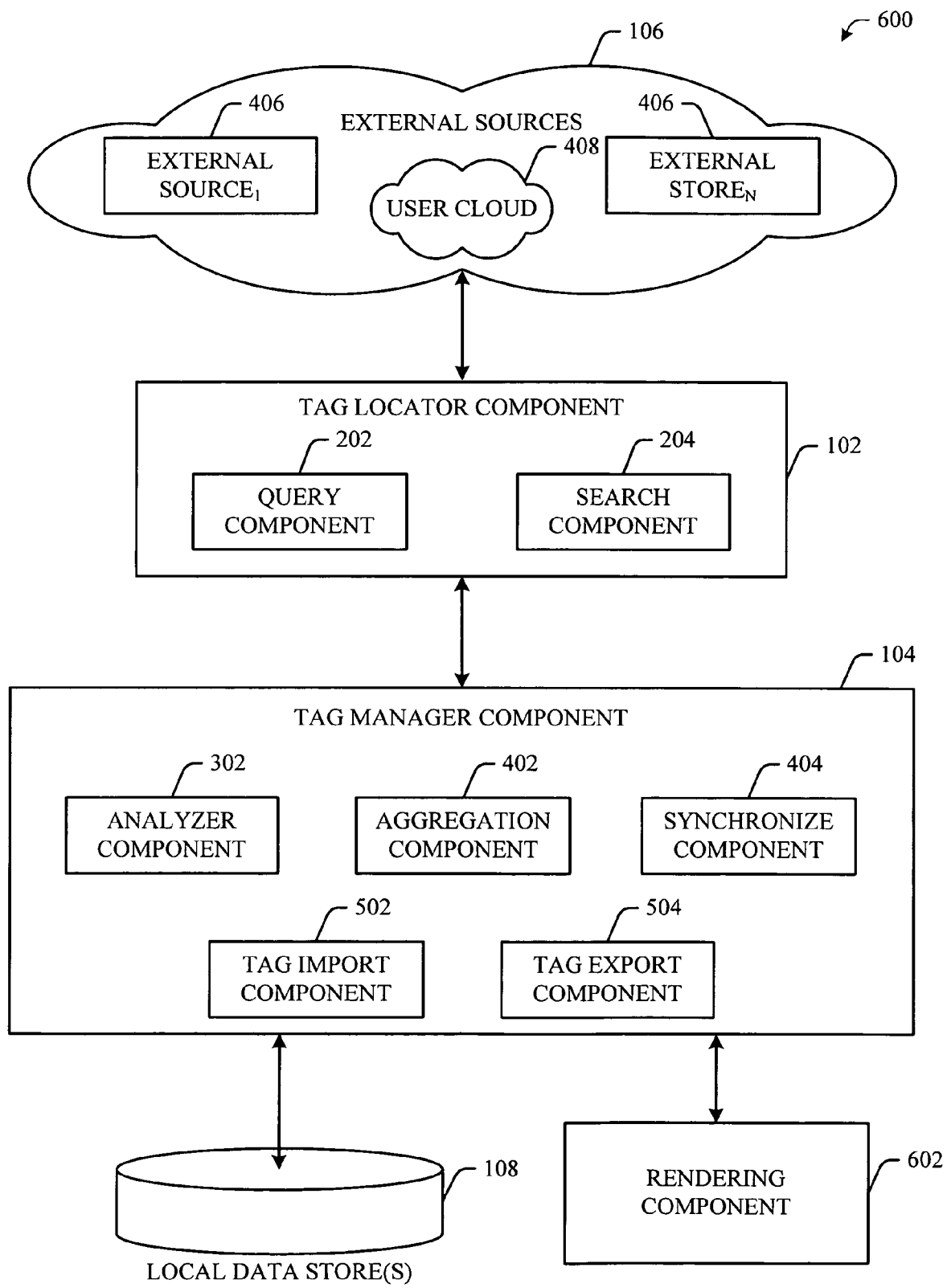
FIG. 6 illustrates an exemplary block diagram of a system that facilitates rendering local and external data in accordance with consolidated taxonomies.

FIG. 6 illustrates a system 600 that includes yet another novel feature of the innovation described herein. Specifically, a rendering component 602 can be provided in order to facilitate a rich data view of all tags associated to a user and/or device. For example, this rendering component 602, together with the tag manager component 104 can facilitate rendering an aggregated and/or synchronized view of all tags associated with a user. Moreover, the rendering component 602 can facilitate generation of a rich view of all data (local and/or remote) that corresponds to a tag or set of tags. The novel functionality of the rendering component 602 will be better understood upon a review of the figures that follow.

It is a novel feature of the innovation to provide a rich data view with respect to all tags associated to or available to a user and/or device. For example, the system can provide for a graphical display of data associated to tags in any pivotal format. By way of more specific example, the system can render a rich view sorted upon fields including, but not limited to, popularity, timing, location, etc. It is to be understood that this novel feature of this innovation can be structured in any format imaginable without departing from the spirit and scope of the claims appended hereto. In other words, pivot tables can be employed to view the tags and data associated therewith in any multidimensional format.

Continuing with a discussion of the system 600 that facilitates rendering (e.g., displaying) aggregated data objects, the data management system 600 can include a rendering component 602 that facilitates viewing aggregated data objects as shown in FIG. 6. As described supra, external data sources 106 can include Internet services, websites, an intranet or any other source of data external to a client component. The client component can include a local data store(s) 108 that maintains local data objects. A rendering component 602, via the tag manager 104, can retrieve data objects from one or more of the external data sources 106 and/or the local data store(s) 108 using any format supported by the data sources.

For example, data objects can be retrieved using a family of XML (extensible markup language) web syndication formats such as RSS, RSS 2.0 or any other suitable format. In one embodiment, the user can select data sources from which to retrieve data objects. This selection can be effectuated via the query component 202. The tag locator component 102 can utilize tags to identify relevant data objects for retrieval. The results of the search can be displayed via the rendering component 602.

In one aspect, the retrieval of data objects from the external data sources 106 can be implemented using existing Internet formats such as RSS 2.0, which is oftentimes used on the web within traditional and non-traditional search applications. These applications frequently use RSS to syndicate search results, news stories, and items with similar tags. In one embodiment, the standard RSS 2.0 format can be expanded to provide additional data. The following table includes novel modifications to the existing RSS 2.0:

| QUERY SYNTAX | |
| --- | --- |
| query attribute: sort/filter/column set | So search provider knows about any special columns visible or sort-orders in user's search results listview, e.g., date, file size, file type |
| query attribute: language | e.g., Spanish; Could be based on browser-accept setting |
| query attribute: market locale | e.g., Spain |
| query attribute: more specific geo-locale info | e.g., zip/postal code, lat/long; IP address |

| RESULTS FORMAT | |
| --- | --- |
| channel: authentication | Able to authenticate a RSS feed, critical for My Cloud scenarios (e.g., where tags authenticated) |
| channel: URL for "more results" | To handle user's click for "More results like these..." |
| channel: values for sort/filter/column set | In combination with "query attribute" in query syntax, these resultant attributes would enable the provider to serve up values for any additional listview columns |
| channel: branding | is channel: image attribute; support fav.ico; provide SVG |
| item: mime-type/handler | Provider can help the shell know how to handle/right-click enable the file. Can use item: enclosure for this |
| item: thumbnail location | Provider can specify location of image and scaling instructions (e.g., fixed, SVG) |
| item: instrumented URL | Provider can specify tracking URL distinct from "display" URL to measure user interaction |
| advertising | lower priority since provider cannot influence the layout |
| spell suggestions/query refinements | lower priority since provider cannot influence the layout |

Figure 7:
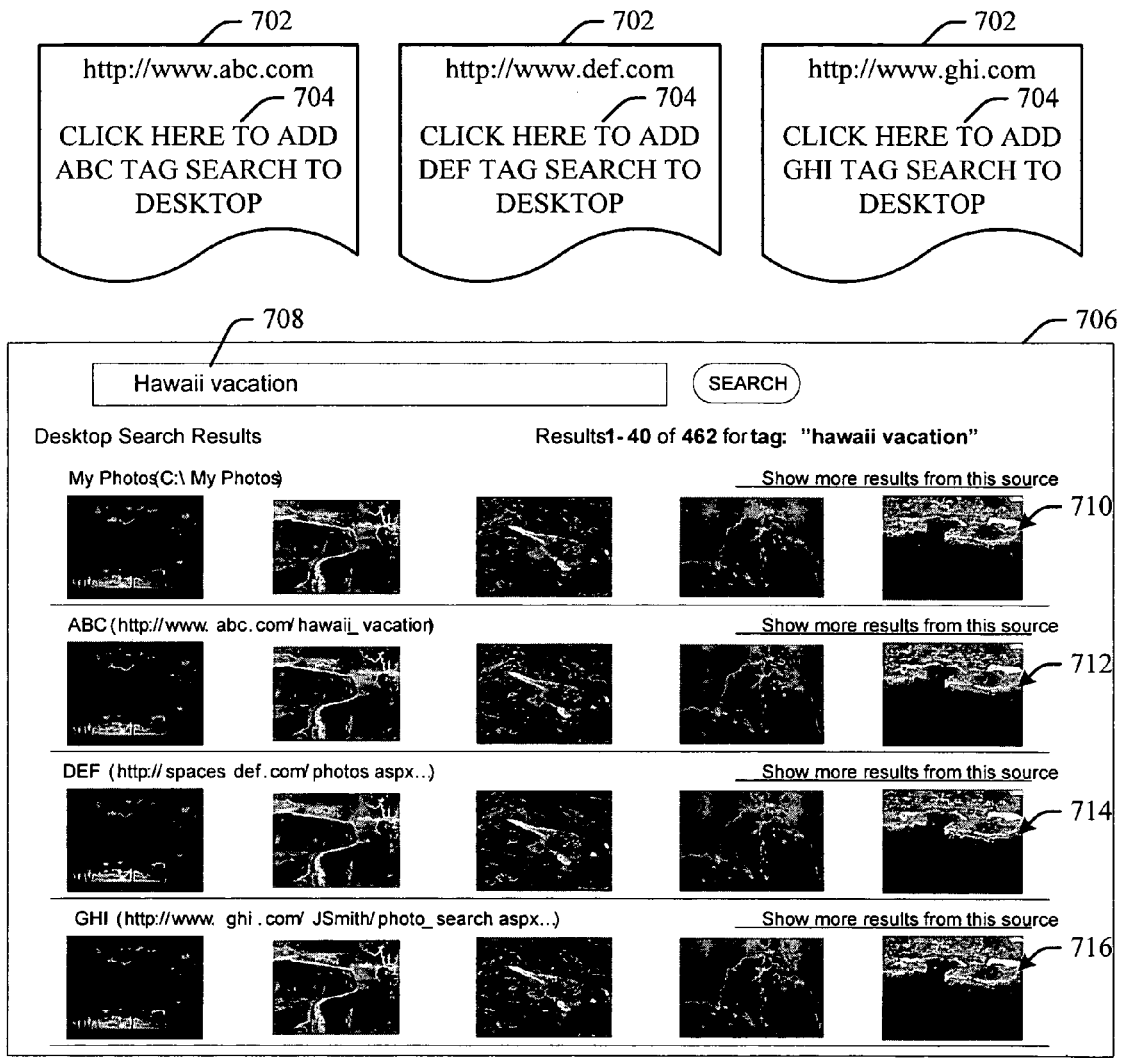
FIG. 7 illustrates a further embodiment of a user interface for a system for viewing aggregated data objects.

Referring now to FIG. 7, illustrated is an embodiment in which the external data sources and services 702 can provide users with a link 704 that facilitates tag management. The link 704 can facilitate adding the external data source or service tags to an aggregated search result. A display, via rendering component 602 of FIG. 6, can provide a user with the results of a search by delivering results from multiple sources on a single user interface 706. The results can be displayed in a viewer interface 706 as shown in FIG. 7. The viewer interface 706 can display the search terms or tags 708. The viewer interface 706 can render aggregated data objects provided by the data sources and local client data objects.

In disparate aspects, the viewer interface 706 can display the search results as a set of data objects, thumbnails representing the data object or links to the data objects. The search results can be grouped in any manner including, but not limited to, by source, relevance, date, etc. For example, a search using tags "Hawaii" and "vacation" can result in data objects retrieved from multiple sources.

More particularly, as shown in FIG. 7, a set of data objects 710 can be retrieved from the local drive (e.g., the "C:" drive) of the client component. A second set of images 712 can be provided from a limited access website. A third set of images 714 can be provided from a public website or online service. A fourth set of data objects 714 can be retrieved from a user-specific website. The viewer interface 706 provides a user with a convenient tool for viewing search results from the different sources in a convenient manner. It is to be understood and appreciated that the aspect shown in FIG. 7 is included to provide perspective to the innovation and novel functionality thereof. As such, this aspect is not intended to limit the scope of the innovation in any way.

Figure 8:
FIG. 8 illustrates an exemplary user interface that generates a rich view of a standing query in accordance with an aspect of the innovation.
Figure 8:
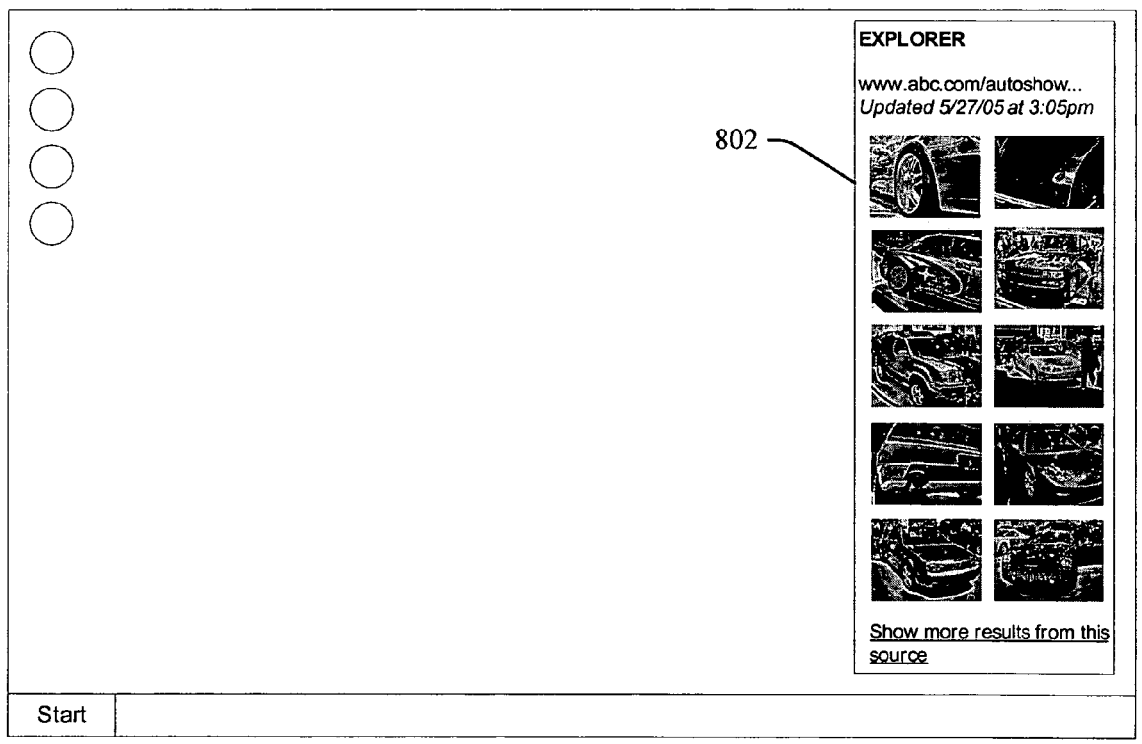

FIG. 8 illustrates another embodiment in which the novel system can provide a user with a viewer interface 802 that displays the results of periodic searches. As described supra, one novel feature of the system is to set a standing query set such that a continual and/or periodic search can be automatically executed. This automatic and/or dynamic search can be executed with respect to user defined or machine inferred tags.

In this embodiment, the viewing component can periodically search one or more data sources for data objects meeting defined search attributes (e.g., query criterion). The viewer interface 802 can be implemented as a window that displays automatic updates to search results. For example, a user might have an interest in automobiles but be unable to attend an auto show. In this scenario, the user can set a standing query to search for specific tags from external sources (e.g., Internet) that relate to the auto show. The standing query provides the user with the ability to continually search the Internet for any photographic images related to the auto show. In this aspect, the viewing system can periodically search and automatically update the viewer interface 802 to reflect the results of the search.

The examples shown in FIGS. 7 and 8 display search results as columns of thumbnail representations of photographic images; however, the viewing system may display search results in any manner useful to or desired by the user. For example, the viewing window can display the search results in a Venn diagram, visually displaying the overlap of tag categories to users. By using the metadata information from the tags, it will be appreciated that the innovation provides users with a powerful searching, sorting, filtering and rich viewing mechanism.

Although the illustrated aspects of FIGS. 7 and 8 are directed to rich viewing mechanisms, it is to be appreciated that resultant data generated via the novel tag location and managing mechanisms can also be rendered to applications as well as to display mechanisms. In other words, the resultant data can be rendered to applications for further processing such as filtering, tracking, analytics, etc.

Figure 9:
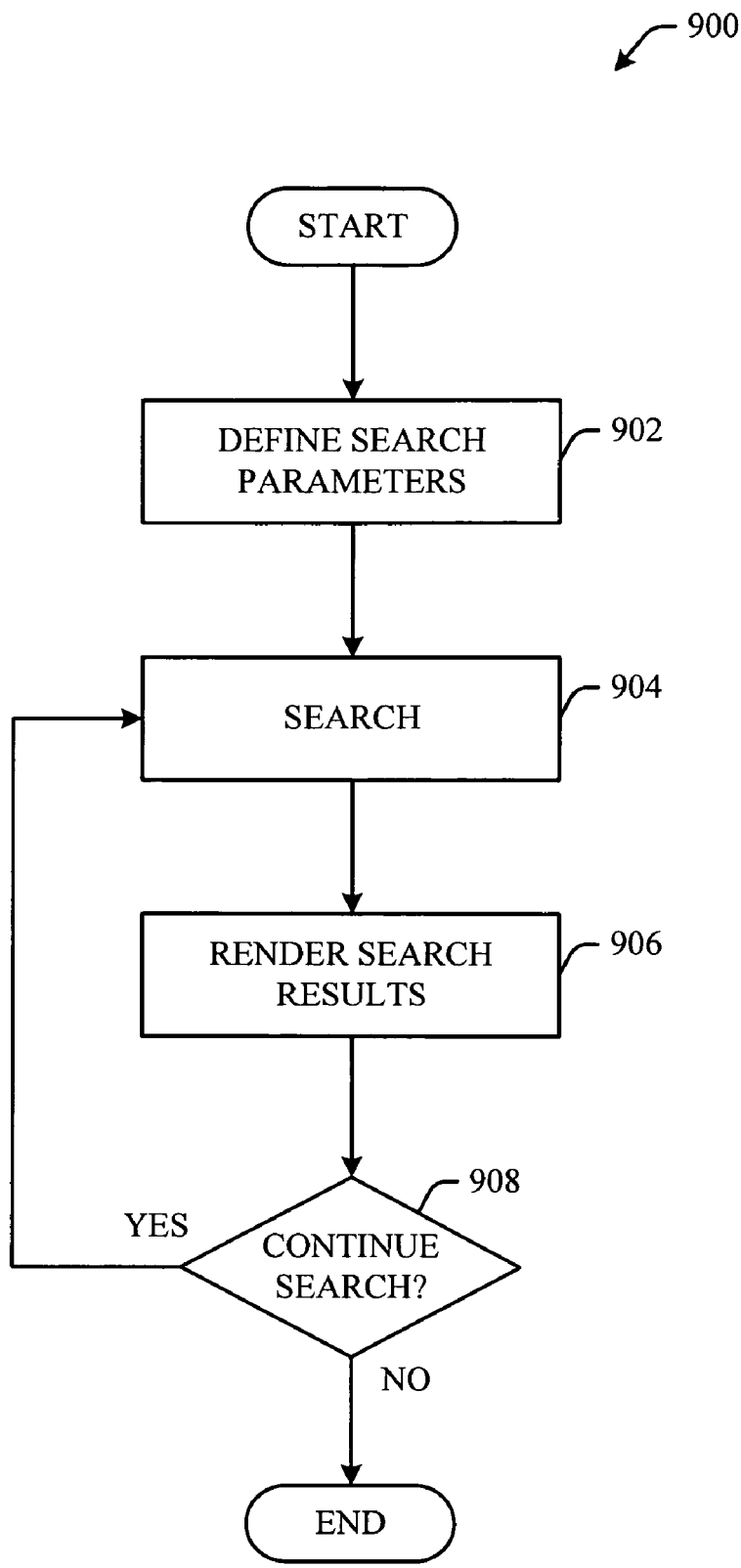
FIG. 9 illustrates a method for performing periodic searches in accordance with an aspect.
Figure 10:
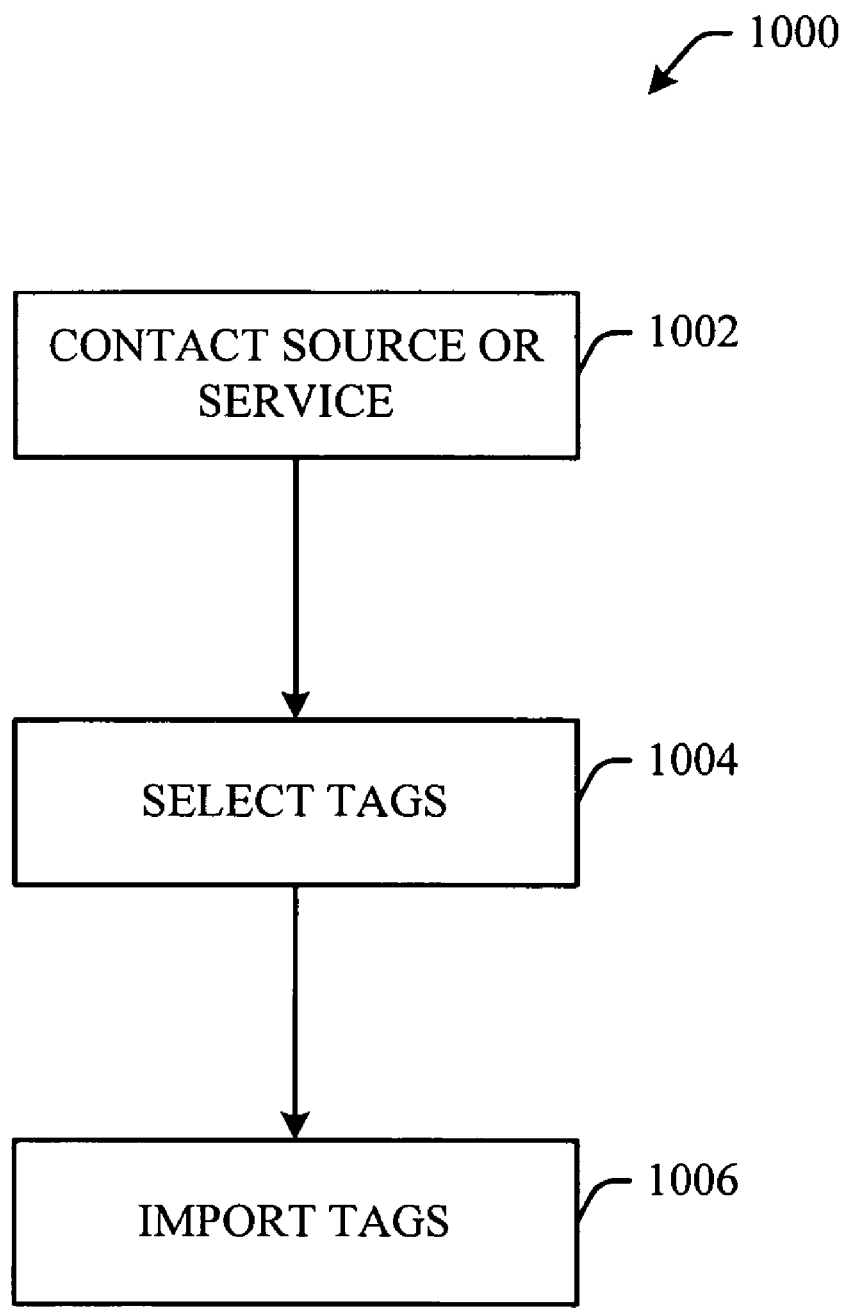
FIG. 10 illustrates an exemplary method for importing tags from an external data source or service.

Referring now to FIGS. 9 and 10, methodologies relating to data management are illustrated. While, for purposes of simplicity of explanation, the methodologies are shown and described as a series of acts, it is to be understood and appreciated that the present methodologies are not limited by the order of acts, as some acts may, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology.

FIG. 9 illustrates a method 900 for continually or periodically searching data sources (e.g., standing query) and reporting search results to a user. Beginning at 902, the search parameters are defined. For example, the user can specify one or more tags, the type of data object (e.g., text file or image file), data sources to be searched and other search parameters. In addition, the user can specify the frequency with which the search will be repeated and a date or time at which the search will end, referred to herein as the search expiration time. In still other aspects, this search criterion can be preprogrammed via rules-based logic or inferred via AI or machine-learning mechanisms.

At 904, the specified data sources are searched for data objects that meet the search tag parameters. The results of the search are rendered at 906. As described, in one aspect, the resultant data can be rendered by updating a viewing window on the client computer desktop, as shown in FIG. 8. In an alternate embodiment, an alert can be rendered, such as an email or popup window, if the search results vary from the results of prior searches. It will be appreciated that the rendering can include the path name of data objects that meet the search parameters, thumbnails or other representations of the data objects, or links to the data objects.

At 908, a determination is made whether to return to 904 and continue searching for data objects or to terminate the method. This determination can be based upon any criteria including, but not limited to, a user prompt, a predefined search parameter (e.g., rule), memory limitations, power limitations, or the like. Alternatively, the search can continue until affirmatively cancelled by a user. Once terminated, a stop block is reached and the process ends. While the interval has been discussed relative to time, it is to be understood that the interval can be any type of measurement or range, provided there is a means to determine a start and end to such range. By way of example and not limitation, that determination to end a process can be based upon a device limitation (e.g., memory or power limitation).

In a further embodiment, the system may provide users with the ability to search for types of tags, rather than user selected specific tags. For example, the user can request retrieval of data objects matching the most popular tags. Popularity, as used herein, can be determined by a number of data objects categorized with a specific tag. In one aspect, the more data objects categorized with a particular tag, the more popular the tag. In another aspect, the most popular tag(s) can be determined based at least in part upon an access frequency.

In still another aspect, a user can utilize the viewing system to determine his or her most popular tags; the most frequently occurring tags for data objects stored in the local data sources, and search the external data sources or services for data objects with those tags. Alternatively, the user can employ the novel functionality described herein to determine the most popular tags utilized on an external data source or service and search the client data component for matching data objects.

In yet another aspect, a user can also utilize the novel functionality to perform time-based searches. In addition or alternatively, the time or date associated with a data object can be considered a tag. For example, the user can request data objects created, posted or modified within a specific time frame (e.g., within the last hour). The user can also combine a time-based search with other tags. For example, the user can query for data objects associated with the most popular tags on the Internet posted within the last hour, day, week, year, etc. In this manner, the user can utilize the viewing system to define "news" rather than relying upon traditional sources such as television broadcasts, newspapers and the like.

As described in detail supra, the data management system can provide users with novel tag management functionality for importing and exporting tags and taxonomies from the client component to external data sources and services and vice-versa. Importing tags and taxonomies to a client component provides users with a tool that facilitates consistency between local client tags and taxonomies with those used by external data sources and services.

By way of example, a user may wish to make the tags associated with local image files consistent with the tags popular of an online photo management and sharing application. By utilizing tags popular on these online applications and services to tag local data, the user can make it easy for others to find any relevant photo images such user elects to upload. In addition, the user will be able to utilize the same tag or tags to search the online service as used to search the client data component. A user can save time by importing a complete or subset of a taxonomy from an external data source or service rather than spending time defining a personal taxonomy.

FIG. 10 illustrates a method 1000 for importing one or more tags from an external data source or service. Although the methodology of FIG. 10 is directed to importing tags, it will be understood upon a review of the figures that follow that synchronization of tags is also contemplated and to be included within the scope of this disclosure and claims appended hereto. For example, the synchronization functionality can incorporate mechanisms such as change tracking, conflict resolution, etc.

Beginning at 1002, the external data source or service from which the tags are to be imported is contacted. This contact can be user specified or performed automatically based upon defined (or inferred) criteria or search terms. At 1004, the tags to be imported to the client component are selected. Users may wish to import a single tag, a set of tags or an entire taxonomy. As illustrated in FIG. 8 supra, in one embodiment, the external data source or service can provide a website with a link that allows the user to automatically export tags to the client component.

At 1006, the tags can be imported to the client component. It is to be understood that the tags can be imported using RSS, RSS 2.0, outline processor markup language (OPML) or any other suitable format. In one embodiment, tags can be periodically imported from a specified external data source or service. The external data source or service can be periodically polled to determine if there are any modifications to the tags and any new or updated tags can (or should) be imported to the client.

Figure 11:
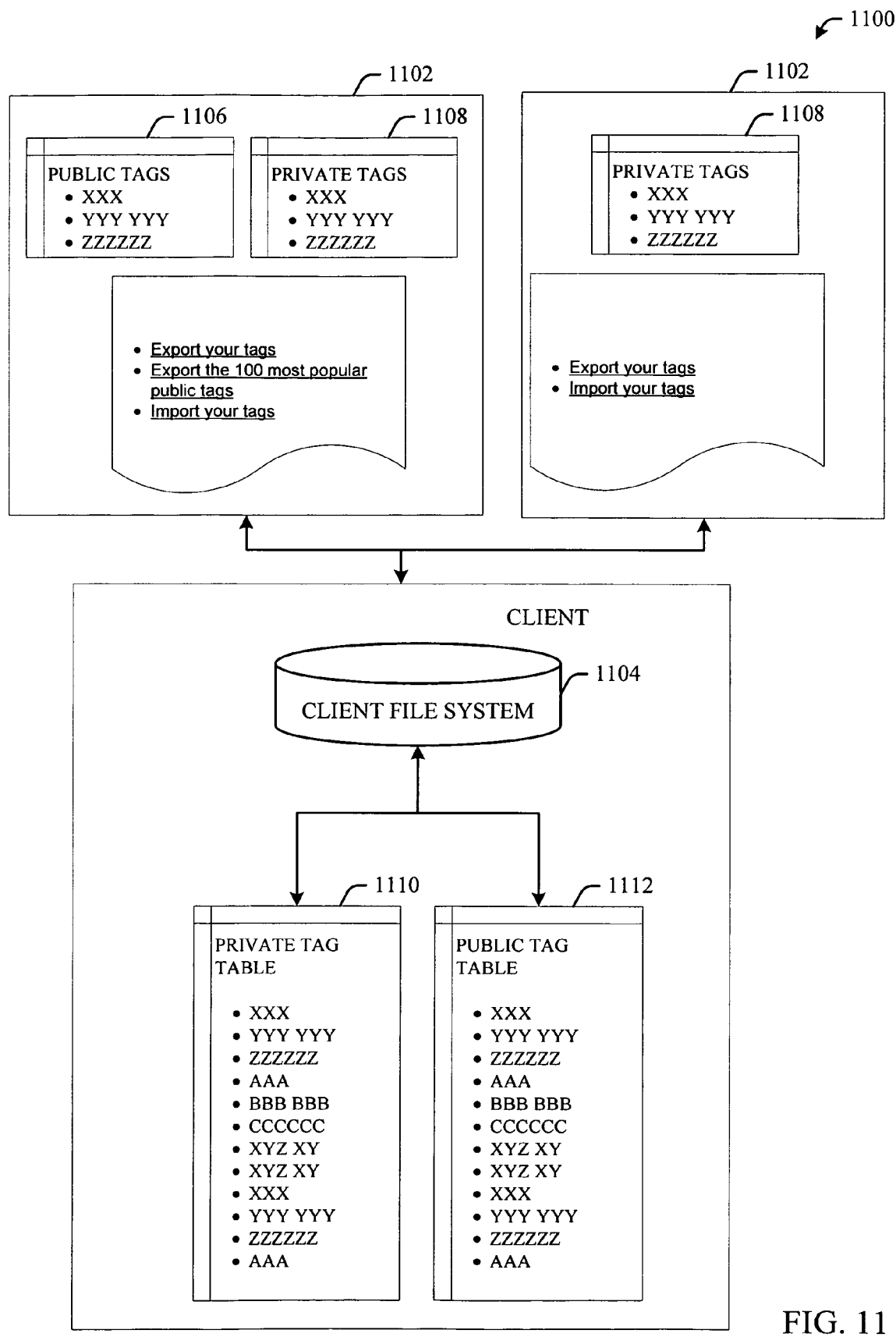
FIG. 11 illustrates a tag management system for importing tags from an external data source or service in accordance with an aspect of the innovation.

FIG. 11 illustrates an embodiment of a system 1100 that can import and/or export tags from one or more external data sources or services 1102 to the client file system 1104. Each online service provider 1102 can have one or more lists of tags, including a public tag list(s) 1106 and a private tag list(s) 1108. As used herein, a public tag list 1106 is available to all users, while access to a private tag list 1108 is limited to a single user or a group of users. The file system 1104 can maintain a client private tag table 1110 including the user tags or tags for a group to which the user belongs.

Essentially, the private tag table 1110 includes tags created by an authenticated source. For example, all client components within a law firm may utilize a single taxonomy for documents including tags such as "Intellectual Property," "Corporate," "Real Estate," "Litigation" and the like. The client component can include a separate client public tag table 1112 including tags imported from public sources such as the online service providers 1102. In an alternate embodiment, the client component may include a single tag table.

Tags from both the public tag table 1110 and the private tag table 1112 can be available to the user to apply to data objects either on the client component or online. The tag lists can be exported from the private and public tag table 1110 and/or 1112 to client applications (e.g., search engines, toolbars), which can then utilize the tags. The ability to utilize a single set of tags in multiple environments makes it more likely that users will be consistent with nomenclature and easier for users to locate their data objects. In addition, if a user employs the taxonomy of online service providers on the client component, when the user uploads data objects to the online service providers 1102, other users will be able to locate the data objects, provided the user has given authorization for others to view such data objects.

In a further embodiment, the tag management system can provide users with the ability to export tags from their tag lists to online service providers. For example, a user may desire to use tags from their network mail system (e.g., Microsoft Outlook-brand email) on an online email account (e.g., Gmail™-brand email). In one aspect, the tag management system can require users to explicitly consent prior to exporting tags from their tag list to prevent the exportation of sensitive or confidential information. It will be appreciated that an authentication protocol can be employed to secure the information. For example, a simple challenge/response (e.g., password) system can be employed.

When importing or exporting tags, the tag management system can translate hierarchical tags to flat tags or flat tags to hierarchical tags as necessary and/or desired. As used herein, hierarchical tags are tags that have a tree-like structure. For example, the traditional file system, which includes directories and subdirectories, can be viewed as a hierarchical tag system. A document in a "finances" folder in the "personal" subdirectory within the "My Documents" directory has a hierarchical tag that reflects the relationship between the folder, subdirectory and directory in which the document is stored.

On the other hand, a flat tag is simply a tag that has no inherent, hierarchical information. Flat tags are frequently used in collaborative categorization using freely chosen keywords, known as folksonomies. To express the same information as a hierarchical tag using a flat tag, the tag management system may concatenate the separate elements of the hierarchy. In the above example, the resulting flat tag can be "My_Documents_personal_finances." In an alternate embodiment, the tag management system can create three separate flat tags from the hierarchical tag format (e.g., "My Documents", "personal" and "finances").

Turning now to a discussion of a user interface that facilitates tag management and as illustrated in FIG. 12, the data management system can include a graphical user interface (GUI) 1200, also referred to herein as the tag controller, to provide users the ability to access and manage tags defined in the user's private and public tag tables. Using the tag controller 1200, the user may select and apply tags to data objects on the client, the Internet or any other environment that supports tagging, thereby providing the user with a universal tag controller.

In an embodiment, the tag controller 1200 can be resident to the client component. Therefore, when the user utilizes the tag controller 1200, third parties will be unable to access the user's list or lists of tags. The tag controller 1200 can be analogous to the Open File dialog, which allows users to select files from client computers, but allows third parties to view and access only those files that the users selects and chooses to export. Similarly, the tag controller may only upload and grant access to tags selected by users.

The tag controller interface 1200 can be implemented in any manner that provides the user with access to their tag lists. For example, the tag controller may utilize a "word wheel" dialog or "look-ahead typing" to assist users in finding and selecting appropriate tags. Use of a word wheel or look-ahead typing to suggest appropriate tags can minimize "near miss" problems where a user creates two nearly identical tags (e.g., "finance" and "finances"). As shown in FIG. 12, if a user begins typing a tag name (e.g., "XY"), the tag controller may display all tags beginning with the characters typed thus enabling the user to view similarly named tags. The user can pick a previous utilized tag name by selecting the name in the list.

Tag controller 1200 and the other functionalities discussed herein can be implemented as part of the client's operating system, or could be packaged for separate installation. For example, the tag controller can be packaged within the toolbar or other utility or control system mechanism.

Figure 13:
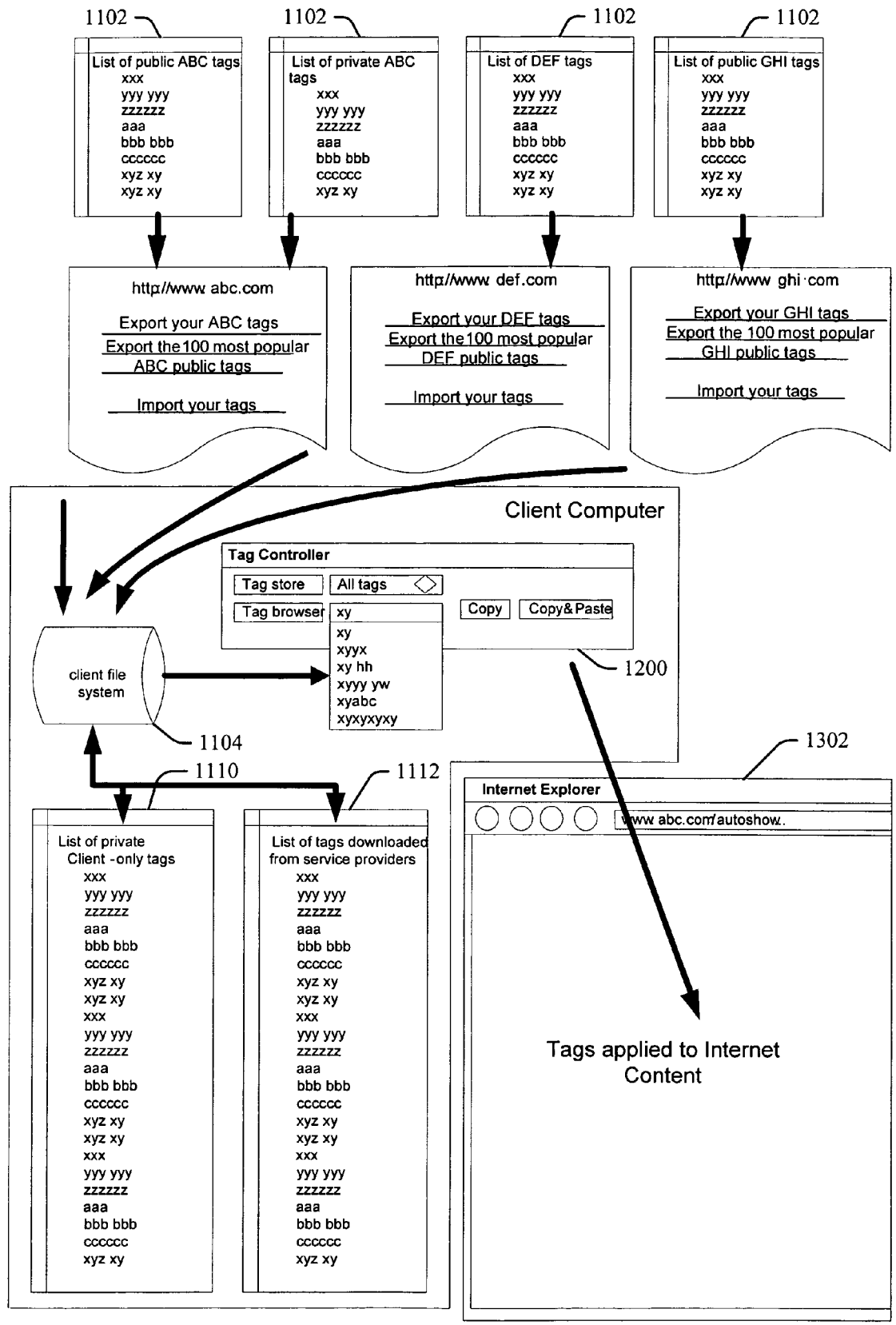
FIG. 13 illustrates an embodiment of a tag management system in accordance with an aspect of the innovation.

FIG. 13 illustrates an alternative embodiment of a tag management system. In accordance with the system, Internet services 1102 can import and export tags to the client computer. The client file system 1104 of the client computer controls tables 1110 and 1112 of public and private tags. A tag controller 1200 provides users with an interface to apply tags to Internet content using an Internet application 1302 (e.g., Internet Explorer).

Figure 14:
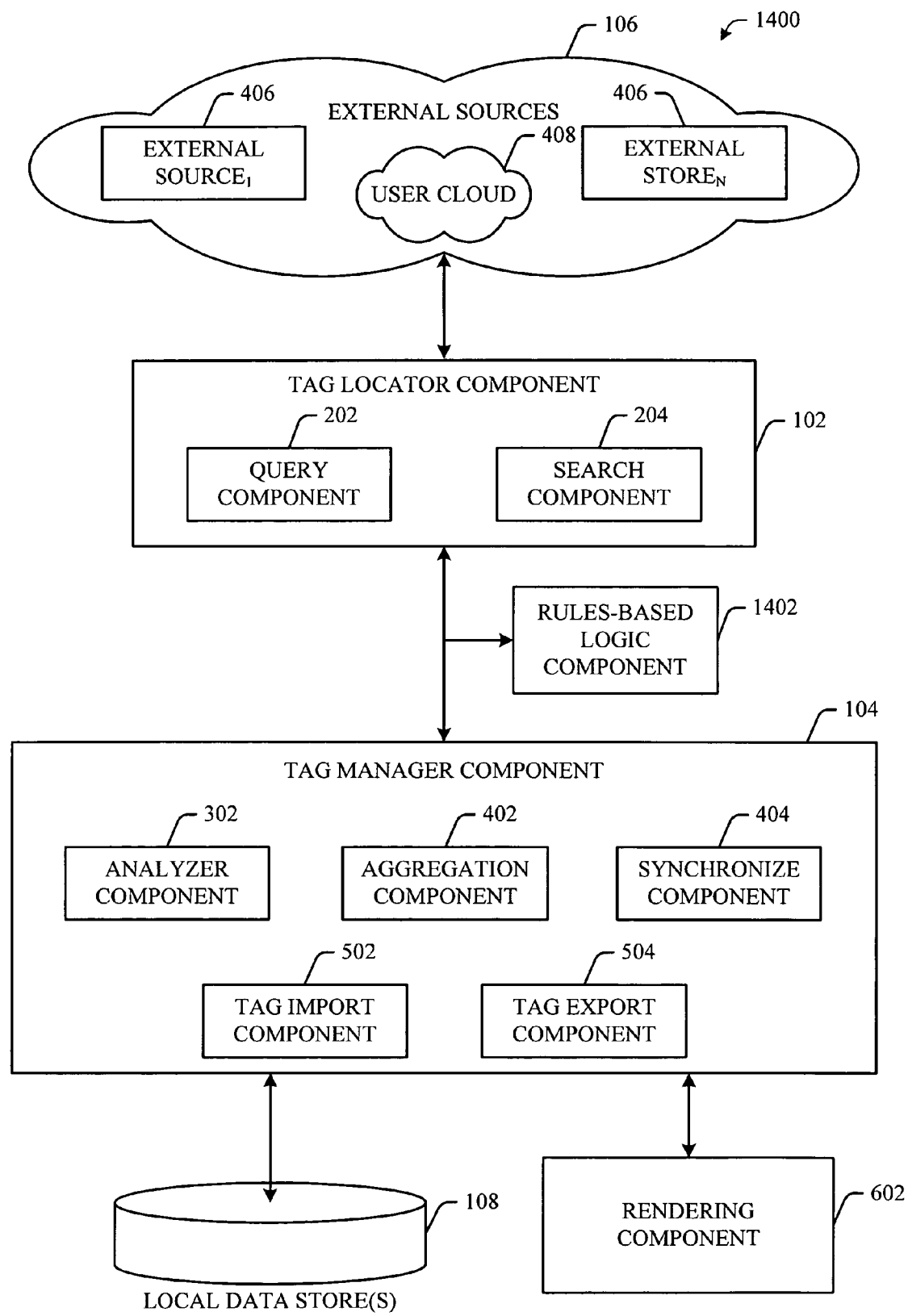
FIG. 14 illustrates an exemplary architectural block diagram of a system that employs a rules-based logic component in accordance with tag management.

With reference now to FIG. 14, an alternate aspect of the novel functionality is illustrated as system 1400. More particularly, system 1400 can include a rules-based logic component 1402 that can provide a criterion by which one or more processes can be controlled. In accordance with this alternate aspect, an implementation scheme (e.g., rule) can be applied to define and/or implement a query, define and/or locate a data source, define a polling frequency, etc. By way of example, in one aspect, the rules-based implementation can automatically and/or dynamically define and implement a query of a data store with respect to a tag and/or group of tags. In response thereto, the rules-based implementation can facilitate selection (e.g., filtering) of data component(s) included within the result(s) by employing a predefined and/or programmed rule (s) based upon any desired criteria (e.g., keyword, tag name, file type, file size, file location, hardware characteristics).

By way of example, a user can establish a rule that can implement a query of a preferred type of file (e.g., music) having a tag "rock." In this exemplary aspect, the rule can be constructed to select all music files from data stores or source locations having "rock" as a tag. Accordingly, a result set of data components can be obtained, previewed and/or manipulated as desired. For example, a rule can be set up to only retrieve data from trust sources. Once finalized, a rich view can be generated and rendered to a user. It will be appreciated that any of the specifications utilized in accordance with the subject innovation can be programmed into a rules-based implementation scheme.

In the exemplary aspect of FIG. 14, the rules-based logic component 1402 can be programmed or configured in accordance with any user-defined preference. By way of further example, a rule can be established in accordance with a specific hardware configuration and/or limitation. For example, a rule can be constructed in accordance with specific memory capacity and/or display of a device. In other words, a rule can be established to take into consideration the specific limitations of a hardware device (e.g., memory capacity). Thus, in one aspect, if a specific handheld device has low memory capacity, a rule can be generated to ignore and not return files exceeding a predefined size threshold.

Figure 15:
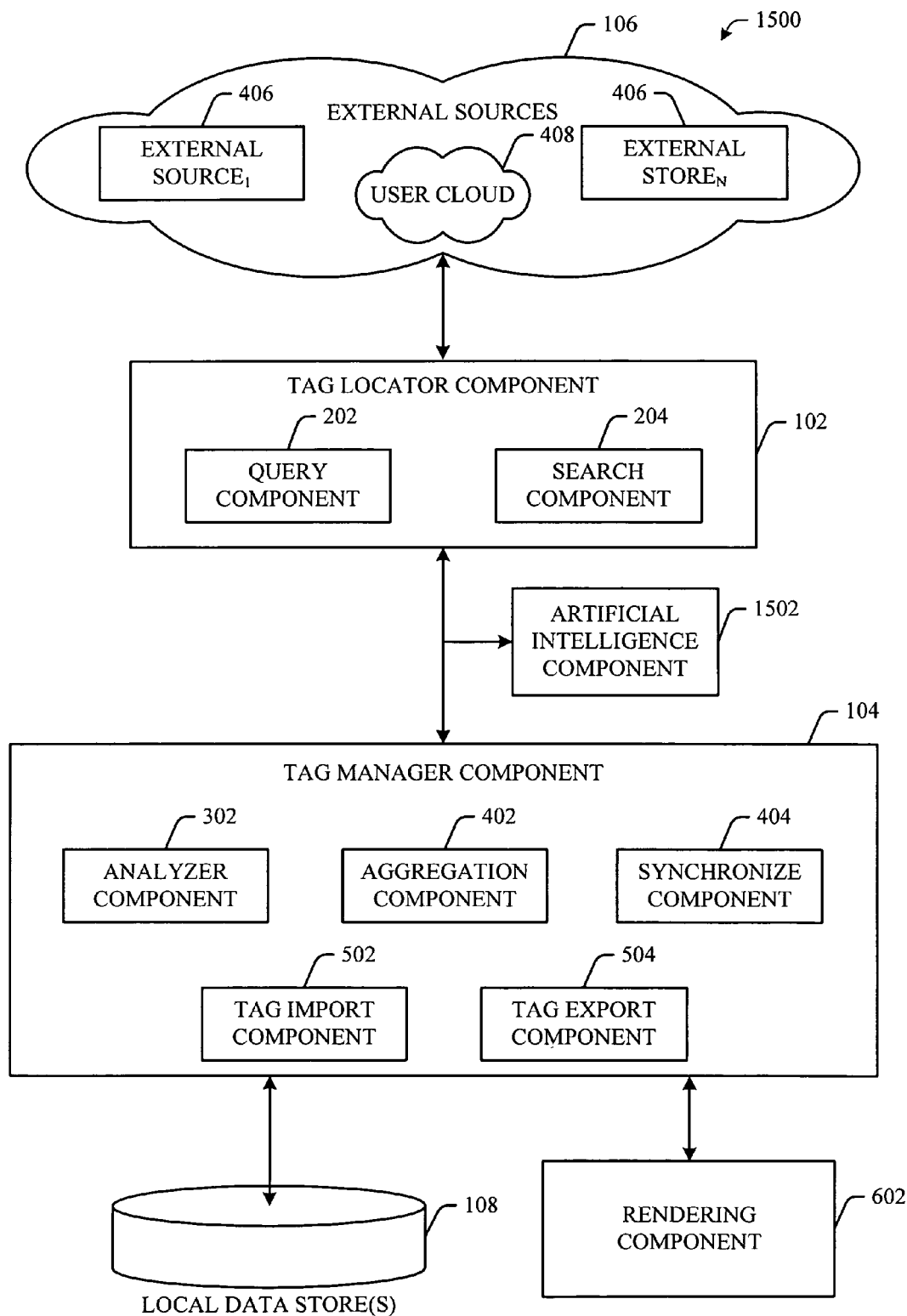
FIG. 15 illustrates an exemplary architectural block diagram of a system that employs an artificial intelligence component in accordance with tag management.

FIG. 15 illustrates a system 1500 that employs AI, which facilitates automating one or more features in accordance with the subject innovation. The subject innovation (e.g., in connection with query configuration, data location, timing) can employ various AI-based schemes for carrying out various aspects thereof. For example, a process for determining a keyword and/or variation thereof to search upon can be facilitated via an automatic classifier system and process. Moreover, the classifier can be employed to determine which sites/locations to search for tags and/or data related to the tags.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of database systems, for example, attributes can be words or phrases or other data-specific attributes derived from the words (e.g., database tables, the presence of key terms), and the classes can be categories or areas of interest.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria criterion by which to query, locations to query, polling frequencies, etc.

Figure 16:
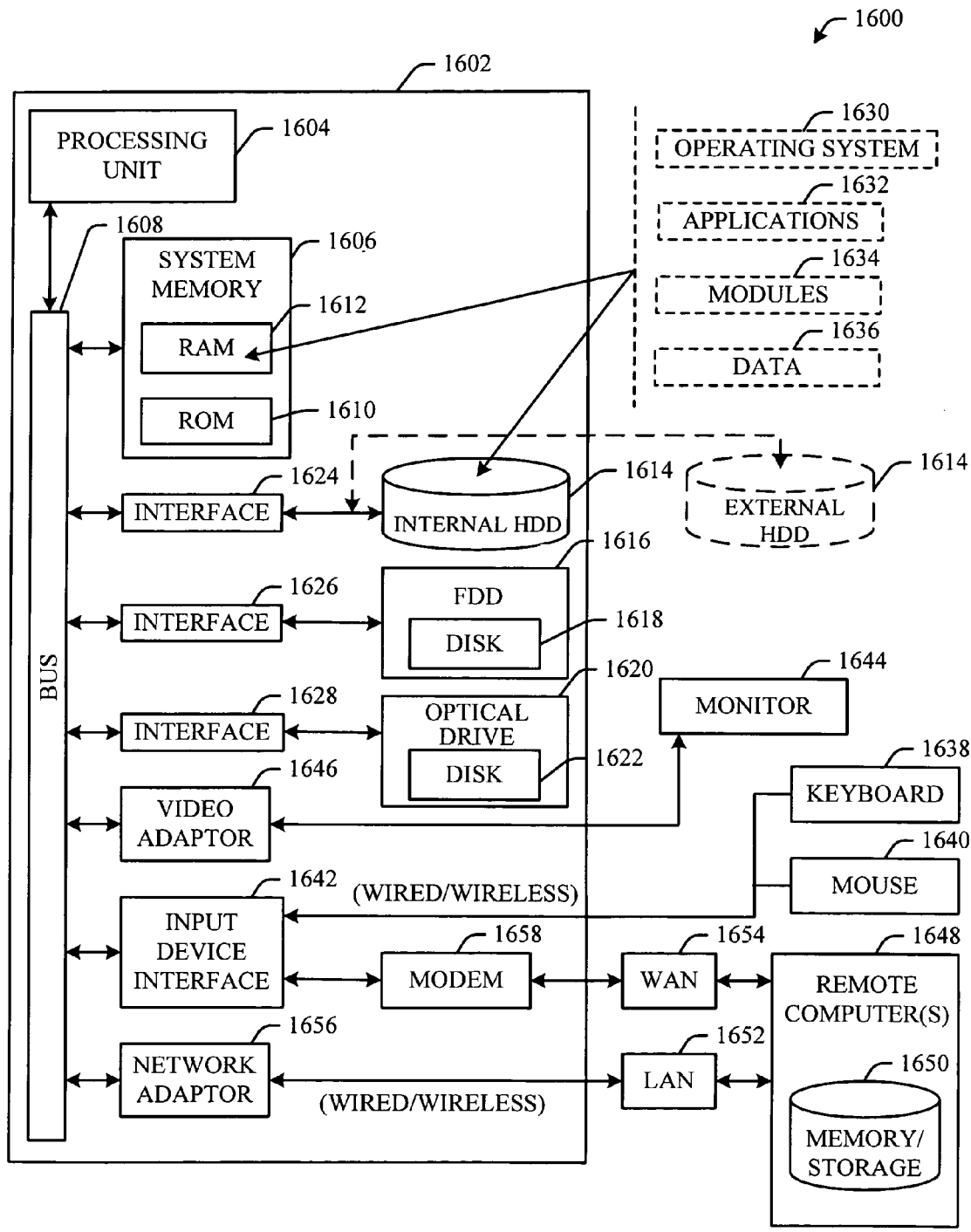
FIG. 16 illustrates a computing environment for a data management system.

Referring now to FIG. 16, there is illustrated a block diagram of a computer operable to execute the disclosed architecture. In order to provide additional context for various aspects of the subject embodiments, FIG. 16 and the following discussion are intended to provide a brief, general description of a suitable computing environment 1600 in which the various embodiments of the systems and methods can be implemented. While the systems and methods have been described above in the general context of computer-executable instructions that may run on one or more computers, those skilled in the art will recognize that the systems and methods can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 16, the exemplary environment 1600 for implementing various aspects of the embodiments includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures may also be employed as the processing unit 1604.

The system bus 1608 can be any of several types of bus structure that may further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system (BIOS) is stored in a nonvolatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 may also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies. Other external drive connection technologies are within contemplation of the subject systems and methods.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods for the embodiments of the data management system described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is appreciated that the systems and methods can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) may include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 may operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which may connect to a global communications network, e.g., the Internet.

When used in a LAN networking environment, the computer 1602 is connected to the local network 1652 through a wired and/or wireless communication network interface or adapter 1656. The adaptor 1656 may facilitate wired or wireless communication to the LAN 1652, which may also include a wireless access point disposed thereon for communicating with the wireless adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 17:
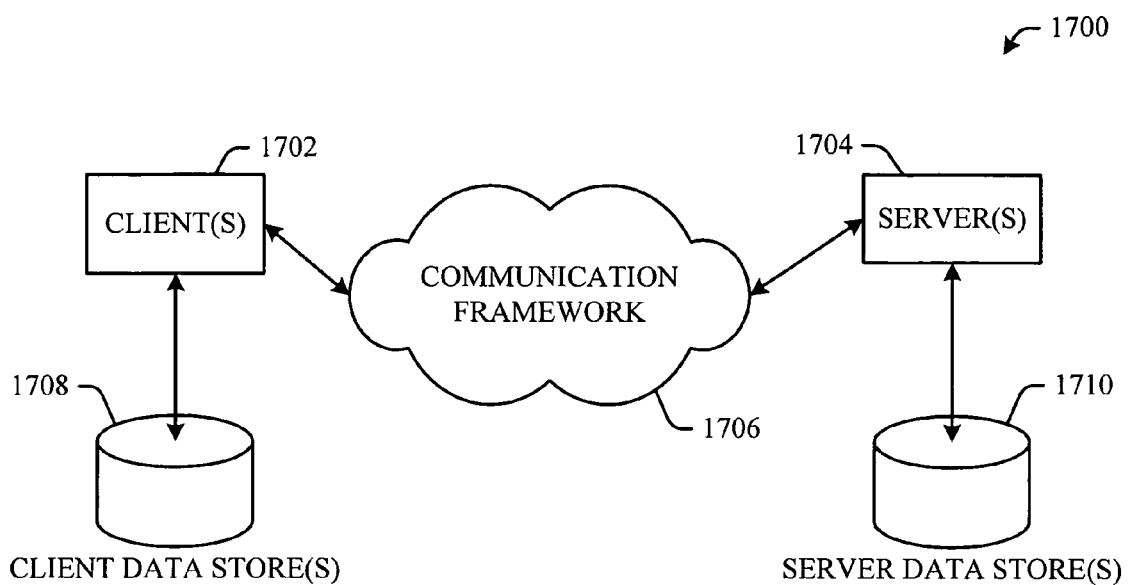
FIG. 17 illustrates an operational environment for a data management system.

Referring now to FIG. 17, there is illustrated a schematic block diagram of an exemplary computing environment 1700 in accordance with the subject embodiments. The computing environment 1700 includes one or more client(s) 1702. The client(s) 1702 can be hardware and/or software (e.g., threads, processes, computing devices). The client(s) 1702 can house cookie(s) and/or associated contextual information.

The computing environment 1700 also includes one or more server(s) 1704. The server(s) 1704 can also be hardware and/or software (e.g., threads, processes, computing devices). One possible communication between a client 1702 and a server 1704 can be in the form of a data packet adapted to be transmitted between two or more computer processes. The data packet may include a cookie and/or associated contextual information, for example. The computing environment 1700 includes a communication framework 1706 (e.g., a global communication network such as the Internet) that can be employed to facilitate communications between the client(s) 1702 and the server(s) 1704.

Communications can be facilitated via a wired (including optical fiber) and/or wireless technology. The client(s) 1702 are operatively connected to one or more client data store(s) 1708 that can be employed to store information local to the client(s) 1702 (e.g., cookie(s) and/or associated contextual information). Similarly, the server(s) 1704 are operatively connected to one or more server data store(s) 1710 that can be employed to store information local to the servers 1704.

What has been described above includes examples of embodiments of the data management system. It is, of course, not possible to describe every conceivable combination of components or methodologies, but one of ordinary skill in the art may recognize that many further combinations and permutations are possible. Accordingly, the embodiments are intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary embodiments. In this regard, it will also be recognized that the embodiments include a system as well as a computer-readable medium having computer-executable instructions for performing the acts and/or events of the various methods.

In addition, while a particular feature of the embodiments may have been disclosed with respect to only one of several implementations, such feature can be combined with one or more other features of the other implementations as can be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computerized system that facilitates tag management, comprising:
   a processing unit; and
   a memory for storing computer-executable instructions that when executed by the processing unit executes:
   a tag locator component that searches for a tag located in a remote source associated with a particular user or a content type; and
   a tag manager component of a local source that facilitates maintaining the tag from the remote source, wherein the tag manager component
   (1) consolidates the tag from the remote source with a plurality of disparate tags maintained in the local source to form a set of tags, and
   (2) synchronizes the set of tags containing at least the tag from the remote source and the plurality of disparate tags from the local source to harmonize the tag from the remote source with the plurality of disparate tags from the local source, the synchronized set of tags being communicated to the local source and the remote source.

2. The system of claim 1, further comprising a query component that identifies the tag based upon a criterion.

3. The system of claim 2, wherein the tag manager component exports a plurality of tags from the local source to the remote source based at least in part upon the criterion.

4. The system of claim 2, wherein the tag manager component imports a plurality of tags from the remote source to the local source based at least in part upon the criterion.

5. The system of claim 2, wherein the criterion is at least one of an alphanumeric string, a location, and a type.

6. The system of claim 1, wherein the local source is a client data store and the remote source is an Internet data sharing application.

7. A computerized system for aggregating data objects, comprising:

an external data source that includes a data object associated with a first tag;
a client component that includes a client data object associated with a second tag;
one or more processing units; and
one or more memory for storing computer-executable instructions that when executed by the one or more processing unit executes:
a search component that searches the external data source and the client component and retrieves the data object and the client data object based at least in part on the first tag and the second tag;
a tag manager component that consolidates one or more first tags from the external data source and one or more second tags from the client component to form a set of tags and that synchronizes the set of tags between the client component and the external data source to harmonize the one or more first tags from the external data source with the one or more second tags from the client component, the synchronized set of tags being communicated to the client component and the external data source;
a rendering component that delivers the retrieved data object and the retrieved client data object; and
a displaying component that displays the synchronized set of tags.

8. The system of claim 7, wherein the rendering component displays a representation of the retrieved data object and the retrieved client data object.

9. The system of claim 7, wherein the external data source is an Internet-based data sharing application.

10. The system of claim 7, wherein the search component utilizes a standing query based at least in part on the first tag or the second tag.

11. One or more computer readable storage media having computer-executable instructions stored thereon that executes a method of facilitating tag management, the method comprising:
searching for a tag located in a remote source;
consolidating the tag from the remote source with a plurality of tags maintained in a local source to form a set of tags; and
synchronizing the set of tags containing at least the tag from the remote source and the plurality of tags from the local source to harmonize the tag from the remote source with the plurality of tags from the local source, the synchronized set of tags being communicated to the local source and the remote source.

\* \* \* \* \*